United States Patent
Stergiopoulos et al.

(10) Patent No.: US 6,236,705 B1
(45) Date of Patent: May 22, 2001

(54) METHOD FOR TRACING ORGAN MOTION AND REMOVING ARTIFACTS FOR COMPUTED TOMOGRAPHY IMAGING SYSTEMS

(75) Inventors: Stergios Stergiopoulos, Toronto; Amar C. Dhanantwari, North York, both of (CA)

(73) Assignee: Her Majesty the Queen in right of Canada, as represented by the Minister of National Defence, Ottawa (CA)

(*) Notice: Subject to any disclaimer, the term of this patent is extended or adjusted under 35 U.S.C. 154(b) by 0 days.

(21) Appl. No.: 09/334,640

(22) Filed: Jun. 17, 1999

Related U.S. Application Data

(60) Provisional application No. 60/089,604, filed on Jun. 17, 1998.

(51) Int. Cl.$^7$ ................................................ A61B 6/03
(52) U.S. Cl. ................................................ 378/8; 378/901
(58) Field of Search .............................. 378/4, 8, 15, 901

(56) References Cited

U.S. PATENT DOCUMENTS 4,635,293 * 1/1987 Watanabe ............................ 382/44
4,870,692 * 9/1989 Zuiderveld et al. ............... 382/6

OTHER PUBLICATIONS

Stergiopoulos, "Implementation of Adaptive and Synthetic-Aperture Processing Schemes in Integrated Active-Passive Sonar Systems", Proceedings of the IEEE, vol. 86, No. 2, Feb. 1998, pp. 358–396.

Stergiopoulos, "Limitations on towed-array gain imposed by a nonisotropic ocean", J. Acoust. Soc. Am. 90 (6), Dec. 1991, pp. 3161–3172.

* cited by examiner

Primary Examiner—David V. Bruce
(74) Attorney, Agent, or Firm—Larson & Taylor, PLC

(57) ABSTRACT

A method of tracking organ motion and removing motion artifacts in X-ray computer tomography scans is disclosed. An object is irradiated by two sources such that the object is irradiated from a same location at two different time instances. Projection measurement data are detected by a receiving sensor array. The projection measurement data of the object irradiated from the same location at the two different time instances are correlated using a spatial overlap correlator method in order to obtain data indicative of organ motion. The projection measurement data and the data indicative of organ motion are then processed using an adaptive processing method to remove artifacts due to organ motion.

18 Claims, 10 Drawing Sheets

Image Reconstruction
Motion Artifacts

Tracking Of
Organ Motion

Removal of motion artifacts
Using Adaptive Processing

Snapshots 1,5,10,15,10; Sensor #96; mu + 0.25

Slice of Sensor # 96
No Motion

Sensor with Motion Present

Motion Isolated ( Expanded x 2 )

METHOD FOR TRACING ORGAN MOTION AND REMOVING ARTIFACTS FOR COMPUTED TOMOGRAPHY IMAGING SYSTEMS

This application claims benefit of provisional application 60/089,604, filed Jun. 17, 1998.

FIELD OF THE INVENTION

This invention relates generally to image reconstruction in computer tomography and more particularly relates to a method for tracking organ motion and for removing motion artifacts.

BACKGROUND OF THE INVENTION

In computer tomography, 2-D or 3-D image reconstruction is performed using projection data acquired over a period of time in a scan comprised of a series of projections. Each projection is a snapshot of a patient's organs from a different angle, or perspective, and a scan typically includes hundreds of projections. Prior art methods used to reconstruct images from such data presume the patient and his organs are motionless during the entire scan such that a same fixed object is the subject of all acquired projections. Organ motion such as cardiac motion, blood flow, lung respiration or a patient's restlessness during an acquisition process produces artifacts that appear as a blurring effect in the reconstructed image. Such blurring effects substantially complicate diagnosis or may even lead to inaccurate diagnosis putting the patient's health at risk. Furthermore, repeating a scan in case of a complicated diagnosis due to blurring effects exposes the patient unnecessarily to radiation such as X-rays.

Speeding up data acquisition to reduce the blurring effects of organ motion is not possible with current x-ray tube technology. Therefore, signal processing algorithms accounting for organ motion have to be applied in the image reconstruction process.

Several techniques have been proposed to reduce the effects of organ motion. Srinivas, C. and Costa, M. H. M. in "Motion-compensated CT image reconstruction", Proceedings of the IEEE Ultrasonics Symposium, 1, pp. 849–853, 1994, teach motion compensation using a linear model assuming translation and rotation. In U.S. Pat. No. 5,323,007 issued Jun. 21, 1994, Wernick et al. disclose a method for motion compensation using two projections of an object taken from different locations at different time instances. Organ motion is then measured from known image elements and an image is then corrected by solving a set of linear equations. Other techniques model organ motion as a periodic sequence and take projections at a particular point of the motion cycle or to correct image data using motion trajectories obtained from Fourier harmonics as disclosed in U.S. Pat. No. 5,615,677 to Pelc et al. issued Apr. 1, 1997. However, organ motion is too complex for these methods to substantially reduce the blurring effects and makes the prior art methods useful only in a very limited number of cases. In "Tomographic Reconstruction Of Time Varying Object From Linear Time-Sequential Sampled Projections", Proceedings of the IEEE, 0-7803-1775-0/94, pp. 309–312, 1994, Chiu, Y. H. and Yau, S. F. teach a method for compensating for organ motion by iteratively suppressing motion effects from the projections. This method reduces assumed spectral characteristics of the motion artifacts. The method depends on knowledge of at least some properties of the organ motion and requires a substantial number of iterations to converge, thereby requiring a large amount of computing time. In U.S. Pat. No. 5,671,263 issued Sep. 23, 1997, Ching-Ming discloses another spectral method for motion compensation. A high frequency signal of the organ motion is obtained using a high pass filter. The high frequency signal is then subtracted from the projection signal to remove motion artifacts. Unfortunately, removing high frequency components from the projection signal removes small size spatial structures from the image, as well.

In U.S. Pat. No. 5,806,521 issued Sep. 15, 1998, Morimoto et al. disclose a method for motion compensation based on correlating overlapping converted image data in an ultrasound imaging apparatus. In successive image frames a majority of information results from a same geometry. Due to this redundant information the data of two successive image frames is highly correlated. Organ motion between the acquisition of two frames will result in a shift of the correlation peak of the two frames with respect to each other corresponding to the amount of relative motion. Unfortunately, correlation of the two successive image frames taken from different spatial locations results only in a minor reduction of motion artifacts and, furthermore, may lead to cancellation of image details.

It is an object of the invention to provide a method for tracking organ motion and removing motion artifacts, which overcomes the aforementioned problems and substantially reduces motion artifacts in images of a large variety of CT scans.

It is further an object of the invention to provide a method for tracking organ motion and removing motion artifacts for implementation in current CT systems.

SUMMARY OF THE INVENTION

In accordance with the invention, there is provided, a method of tracking motion present during computer tomography scan data acquisition of an object, the method comprising the steps of:

capturing a plurality of image pairs, each image within an image pair captured from substantially a same perspective view of the object;

comparing each image within an image pair of the image pairs to another image of the same image pair to extract differences; and, determining motion using the extracted differences.

In accordance with another aspect of the invention, there is provided, a method of removing motion artifacts in image data of computer tomography scans of an object comprising the steps of:

providing to a processor image data of the object, the image data containing motion artifacts due to motion of the object;

providing to the processor data indicative of the motion of the object; and, using the processor, removing the motion artifacts from the image data using adaptive interference canceling.

In accordance with yet another aspect of the invention, there is provided, a method of tracking motion of components of an object present during computer tomography scan data acquisition of the object, the method comprising the steps of:

rotating intermittently a scanner comprising a source and a receiving sensor array in angular step increments around the object such that the object is irradiated from successive locations at successive time instances;

acquiring projection measurement data at each time instance using the receiving sensor array; and, providing to a processor the projection measurement data for processing, the processing comprising the steps of:

determining successive sensor time series segments, each segment being associated with a full rotation of the scanner and a time difference Δt to a previous segment;

determining an amplitude difference between successive time series segments; and, determining data indicative of organ movement by processing the amplitude differences using a filter back-projection algorithm.

In accordance with the invention, there is further provided, a computer tomography system for acquiring projection image data of an object and for tracking motion of the object during the data acquisition comprising:

a source disposed at a first position for emitting energy in order to irradiate the object; a receiving sensor array for capturing image pairs, wherein each image within an image pair is captured from substantially a same perspective view of the object;

means for irradiating the object such that the emitted energy appears to originate from a second other position;

a mechanism for moving the source to the second other position; and, a processor for comparing the image pairs to extract differences and for determining motion using the extracted differences.

In accordance with another embodiment of the invention, there is provided, a method of tracking phases of a motion cycle of an object present during computer tomography scan data acquisition of the object, the method comprising the steps of:

a) providing to a processor sensor time series, the sensor time series being indicative of projection image data of the object;

b) using the processor, processing the sensor time series to determine spatial overlap correlator time series indicative of amplitude and direction of the object motion;

c) determining a phase of interest of the motion cycle; and, d) autocorrelating the spatial overlap correlator time series with respect to the phase of interest.

BRIEF DESCRIPTION OF THE DRAWINGS

An exemplary embodiment of the invention will now be discussed in conjunction with the attached drawings in which.

DETAILED DESCRIPTION

Figure 1:
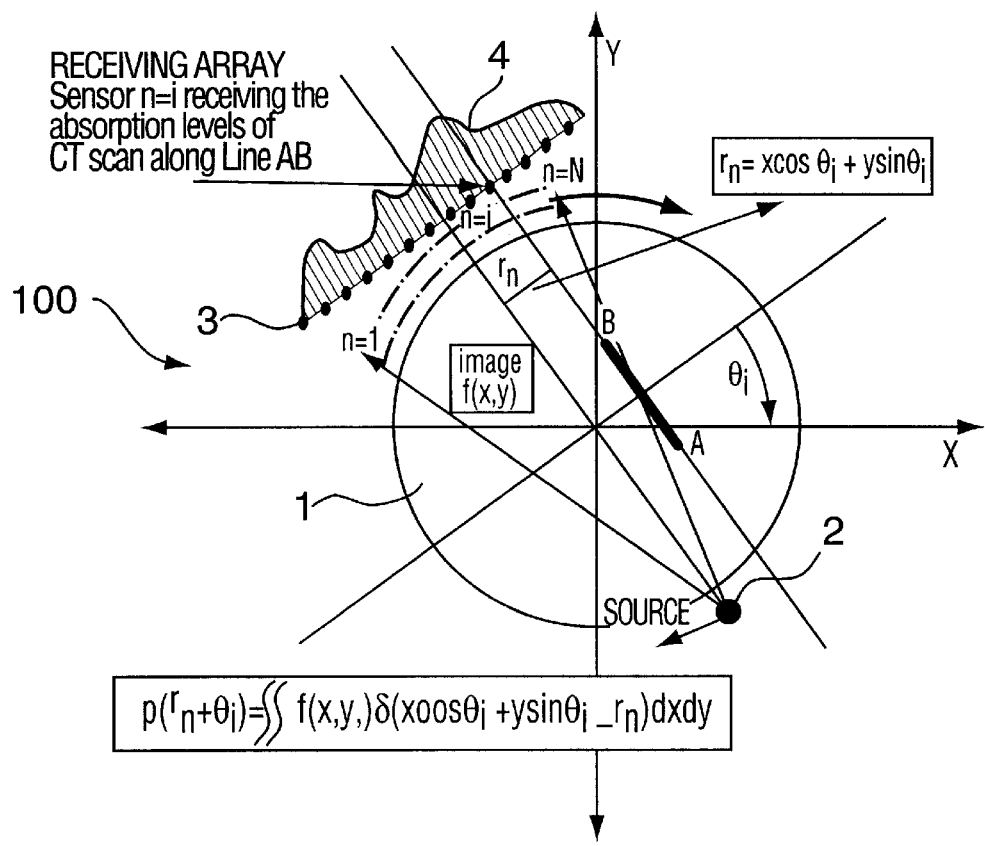
FIG. 1 is a schematic diagram of a data acquisition process for an X-ray CT scanner.

Referring to FIG. 1, a schematic view shows the basic principle of a representative embodiment of a known type of computer tomographical (CT) scanner 100. An object 1, shown in FIG. 1 in an x, y plane, is irradiated by an energy emitting source 2 such as an X-ray source. Alternatively, other sources such as ultra sound and MRI are used. The radiation emitted by the source 2 penetrates the object 1 along straight lines, for example line AB shown in FIG. 1. While penetrating the object 1 the radiation is absorbed by matter of the object 1 typically in the form of tissue. Different types of matter absorb the radiation differently. A receiving sensor array 3 located opposite the source 2 detects the remaining radiation not absorbed by the matter of the object 1 along various straight lines originating from the source 2 and penetrating the object 1. Thus, the receiving sensor array 3 provides projection measurement data 4 of the object 1 comprising different absorption levels along the various straight lines. The source 2 and the receiving array 3 are rotated around the object 1 in angular step increments. After each increment the object 1 is irradiated and a projection image is taken.

The projection measurement data 4 provided by the receiving sensor array 3, $\{p_n(r_n,\theta_i), (n=1, \ldots, N)\}$, are defined as line integrals along the straight lines through the object 1 in the x, y plane, for example, line AB. Image $f(x,y)$ indicates the cross section of the object 1 in the x, y plane. The projection measurement data for parallel projection CT scanners are defined as follows:

$$p_n(r_n,\theta_i) = \int\int f(x,y)\delta\{x\cos\theta_i + y\sin\theta_i - r_n\}dxdy. \quad (1)$$

For fan beam CT scanners, the projection image data 4 include the following parameters of the coordinate system: $r_n = R\sin\sigma_n$, $\theta_i = \sigma_n + \beta_i$. The projection measurement data are, therefore, defined by:

$$g_n(\sigma_n,\beta_i) = p_n\{[r_n = R\sin\sigma_n],[\theta_i = \sigma_n + \beta_i]\}. \quad (2)$$

Organ motion such as cardiac motion, blood flow, lung respiration or a patient's restlessness during acquisition of the projection image data produces artifacts, which appear as a blurring effect in the reconstructed image. According to the invention adaptive and synthetic-aperture processing schemes are applied in order to remove motion artifacts. The adaptive and synthetic-aperture processing schemes are based on computing an appropriate phase correction factor to coherently synthesize spatial measurements. To apply these processing schemes for correcting motion artifacts in CT scans a comparison of spatially overlapping measurements is needed in order to obtain a phase correction factor. The phase correction factor provides data indicative of organ motion and is then used to compensate phase and/or amplitude fluctuations caused by the organ motion.

Figure 2:
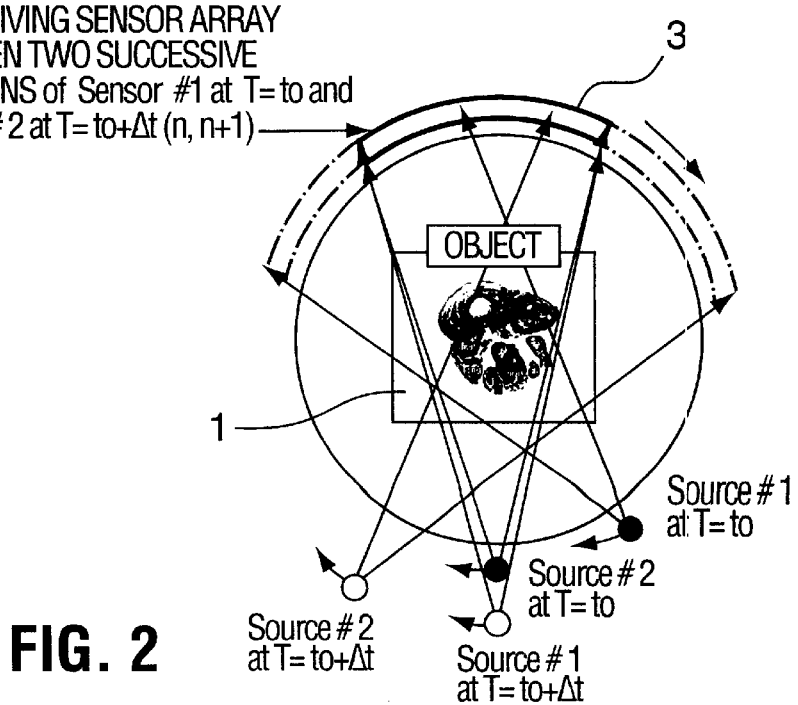
FIG. 2 is a schematic diagram of a data acquisition process according to the invention comprising two sources.

FIG. 2 illustrates an implementation of a spatial overlap correlator method for CT scans according to the invention. An object 1 is irradiated at time to by two energy emitting sources—source # 1 and source # 2—at different spatial locations $s_0$ and $s_1$, indicated by dark dots. A receiving sensor array 3 provides projection measurement data of the object 1 based on the same principle as shown in FIG. 1. At time $(t_0+\Delta t)$ the two sources have been rotated about an angular step increment such that the sources are at spatial locations $s_1$ and $s_2$, indicated by lighter dots. As shown in FIG. 2, the object 1 is irradiated from location $s_1$ by source # 2 at time $t_0$ and by source # 2 at time $(t_0+\Delta t)$. The process is repeated throughout a data acquisition period T and, therefore, provides two spatially identical sets of projection measurement data at any given spatial location and at two successive time instances, separated by $\Delta t$, wherein $\Delta t=T/M$ is the time interval between two successive firings of the X-ray sources. Correlation of two sets of spatially overlapping projection measurement data provides data indicative of organ motion during the time interval $\Delta t$. Supposed $$\{p_{n_{s1}}(r(t),\theta(t),t_0),(n_{s1}=q,q=1,\ldots,N)\} \& \{p_{n_{s2}}(r(t),\theta(t),t_0+\Delta t),(n_{s2}=1,2,\ldots,N-q)\} \quad (3)$$

are $(N-q)$ spatially overlapping projection image data received by the N-element sensor array 3 at the two successive time instances $t_0$ and $(t_0+\Delta t)$ as illustrated by the shaded area in FIG. 2. Based on equation (2), the time dependency of the projection image data for a fan-beam CT scanner is expressed by:

$$g_n(\sigma(t),\beta(t),t_0)=\int\int f(x,y,t)\delta\{x\cos[\sigma(t)+\beta(t)]+y\sin[\sigma(t)+\beta(t)]-R\sin\sigma(t)\}dxdy, \quad (4)$$

wherein $f(x,y,t)$ is the time varying cross section of the object 1 in the x, y plane. The amplitude difference between the two sets of projection measurement data of equation (3) is defined by:

$$\Delta p_{n_0}(r(t),\theta(t),t_0+\Delta t)=p_{n_{s2}}(r(t),\theta(t),t_0+\Delta t)-p_{n_{s1}}(r(t),\theta(t),t_0),$$

for $$(n_0=1,2,\ldots,N-q) \quad (5)$$

For fan-beam CT scanners the difference is defined by:

$$\Delta g_{n_0}(\sigma(t),\beta(t),t_0+\Delta t)=g_{n_{s2}}(\sigma(t),\beta(t),t_0+\Delta t)-g_{n_{s1}}(\sigma(t),\beta(t),t_0),$$

for $$(n_0=1,2,\ldots,N-q). \quad (6)$$

Introducing the spatial overlap concept of equation (3), which assumes that $\{\beta_{s1}(t_0+\Delta t)=\beta_{s2}(t_0)\},\{\sigma_{s1}(t_0+\Delta t)=\sigma_{s2}(t_0)\}$, together with equation (4) into equation (6) provides the amplitude difference as follows:

$$\Delta g_{n_0}(\sigma(t),\beta(t),t_0+\Delta t)=\int\int [f(x,y,t_0+\Delta t)-f(x,y,t_0)] \quad (7)$$
$$\delta\left\{\begin{array}{l}x\cos[\sigma_{s2}(t_0)+\beta_{s2}(t_0)]+\\y\sin[\sigma_{s2}(t_0)+\beta_{s2}(t_0)]-\\R\sin\sigma_{s2}(t_0)\end{array}\right\}dxdy,$$

wherein $[f(x,y,t_0+\Delta t)-f(x,y,t_0)]$ indicates the tomography difference of the time varying cross section of the object 1 in the x, y plane between the time instances $t_0$ and $(t_0+\Delta t)$.

The projection image data acquired using the spatial overlap correlator method as shown in FIG. 2 and defined by equations (6) and (7) may be provided to an image reconstruction algorithm. The image reconstruction algorithm will reconstruct time dependent image changes $[f(x,y,t_0+T)-f(x,y,t_0)]$ taking place during the time period T of the CT scan data acquisition process. In case there is no motion present during the data acquisition process the spatial overlapping projection images are identical and the result of equation (7) is zero. That is, the image reconstruction algorithm of equation (7) tracks only moving components of the projection measurements, whereas stationary components do not appear in reconstructed images. Images containing only moving components may be of diagnostic value in some special applications, for example, displaying heart functions, but in general it is required to reconstruct images containing also the stationary components of the projection measurement data.

Figure 3A:
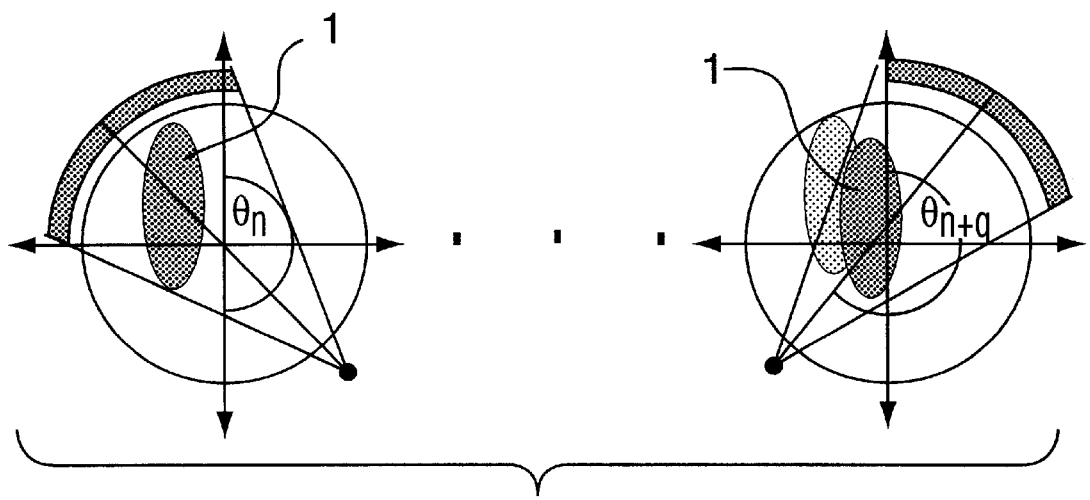
FIG. 3 is a schematic diagram of a spatial overlap correlator method according to the invention.
Figure 3B:
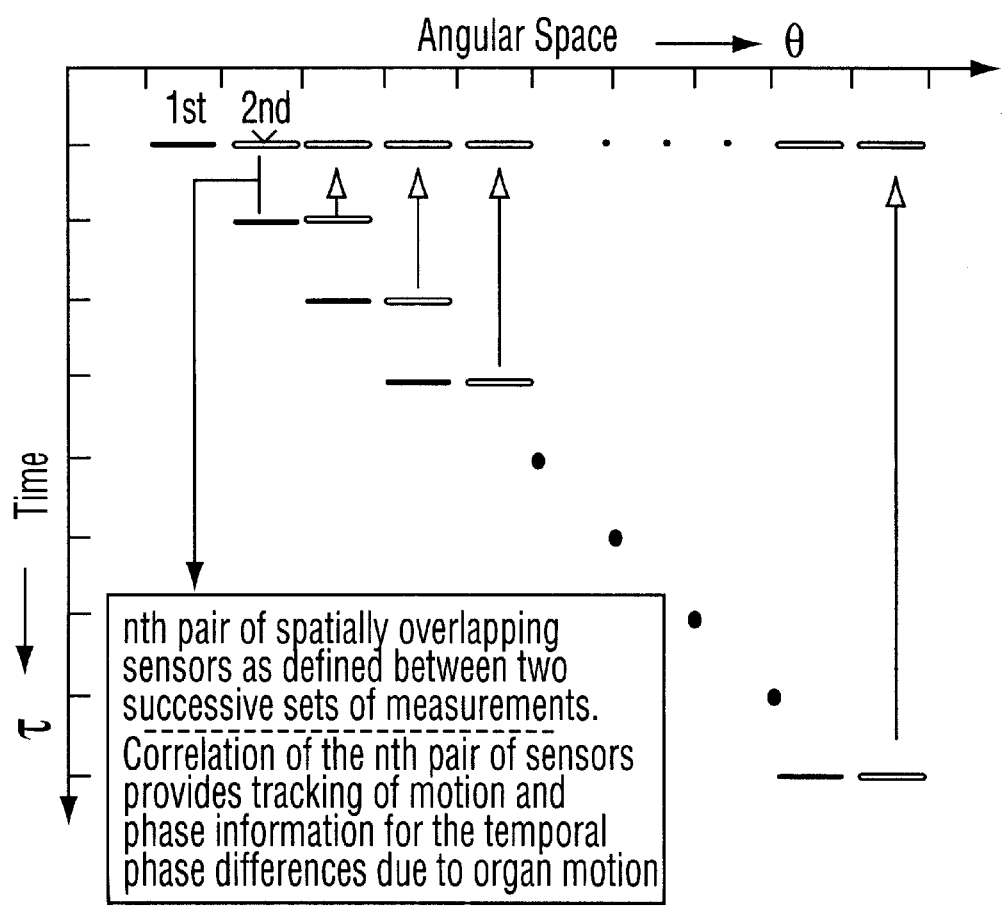
Figure 4A:
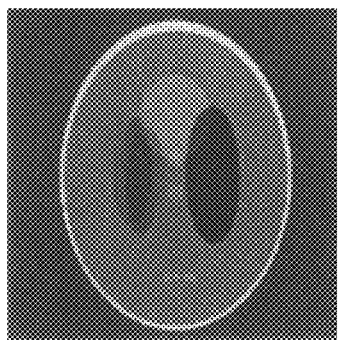
FIG. 4 illustrates removal of motion artifacts using an adaptive processing method according to the invention.
Figure 4B:
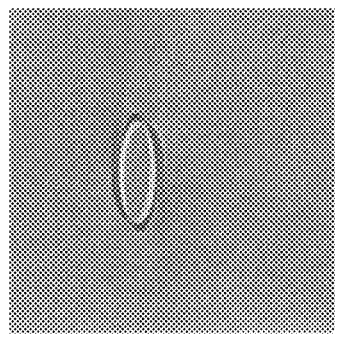
Figure 4C:
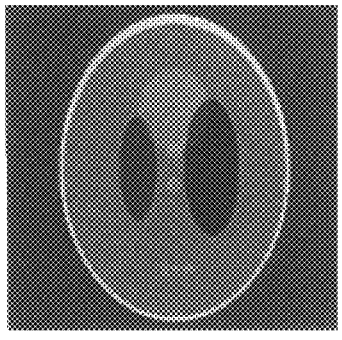
Figure 4G:
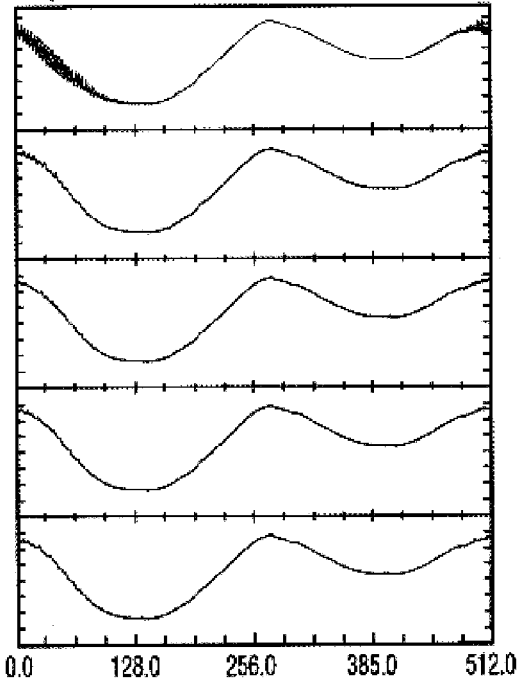
Figure 4D:
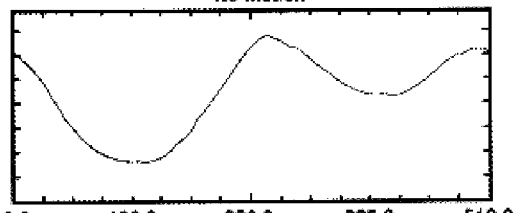
Figure 4E:
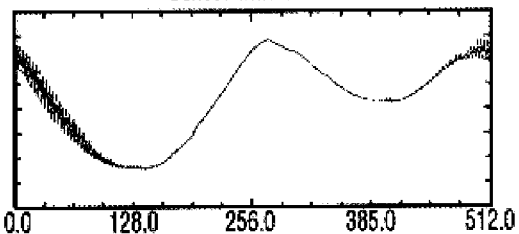
Figure 4F:
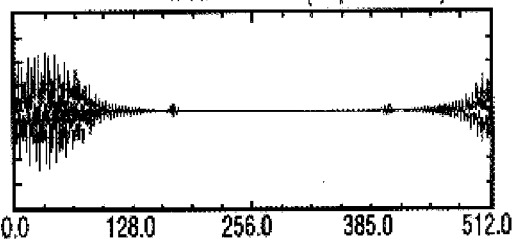

FIG. 3 illustrates the data acquisition process using the spatial overlap correlator method shown in FIG. 2 and defined by equations (6) and (7) in a space-time diagram. The vertical axis is the time axis displaying the different time instances separated by the time difference $\Delta t$. The horizontal axis shows the angular position of source # 1 and source # 2. Image reconstruction algorithms according to the prior art assume stationarity during the data acquisition process or all projection images, indicated by line segments parallel to the horizontal axis, being taken at a same time instance, that is, all line segments are aligned in one line parallel to the horizontal axis. However, during the data acquisition period T the object 1 may vary with time due to organ motion. The projection measurement data acquired using the spatial overlap correlator method are represented by line segments along the diagonal, two line segments for each time instance wherein $1^{st}$ indicates source # 1 and $2^{nd}$ indicates source # 2. Spatially overlapping projection measurements are indicated by line segments taken at two successive time instances and overlapping in angular space.

An obvious method to correct for organ motion during the image reconstruction process is to remove temporal amplitude and phase differences due to organ motion between the spatially overlapping projection images. Ideally, this correction method corrects the projection images with respect to the first acquired projection image. This is equivalent to moving all projection images into a same time instance, that is, all line segments along the diagonal being moved into one line parallel to the horizontal axis as shown in FIG. 3. Unfortunately, this method does not produce satisfactory results because of the very large number M of projection measurements acquired in CT scans. As a result, errors generated during correction of each projection measurement propagate to the correction of the following projection measurement. The error propagation during image reconstruction leads to a significant error accumulation covering all useful information.

A method to remove motion artifacts in image reconstruction of CT scans according to the invention uses an adaptive processing scheme, in particular, an adaptive interferer canceller. Details concerning the adaptive processing scheme are disclosed by the inventor in "Limitations on towed-array gain imposed by a nonisotropic ocean", published in Journal of Acoustic Society of America, 90(6), 3131–3172, 1991, and in "Implementation of Adaptive and Synthetic-Aperture Processing Schemes in Integrated Active-Passive Sonar Systems", published in Proceedings of the IEEE, 86(2), 358–396, February 1998. The adaptive interferer canceller is useful when an interferer is accurately measured. Using tracked organ motion as interferer, the adaptive interferer canceller is an ideal tool for removing motion artifacts from reconstructed images of CT scans. Sensor time series, that is, a series of measurements of one sensor at different time instances, are treated as an input signal of the adaptive interferer canceller algorithm, wherein the input signal comprises noise due to organ motion. The organ motion tracked by the spatial overlap correlator is introduced into the adaptive interferer canceller algorithm as interference noise. The adaptive interferer canceller algorithm then removes the interference noise from the input signal.

FIG. 4 shows a comparison of reconstructed images of the Shepp-Logan phantom using three different methods. Detailed information about the Shepp-Logan phantom is taught by KaK, A. C., in "Image Reconstruction from Projections", chap. 4 in Digital Image Processing Techniques, Academic Press, New York, 1984. Projection image data of the Shepp-Logan test image have been processed using a prior art method, the reconstruction method for the spatial overlap correlator expressed by equations (6) and (7), and the spatial overlap correlator method combined with the adaptive intereferer canceller algorithm. The prior art method comprises a filtered back-projection method including a Ram-Lak filter cascaded with a Parzen window as taught by KaK, A. C. in the publication mentioned above. Geometry and parameters used in the simulations were equivalent to Elcint's CT Twin RTS medical tomography system.

The upper right image shows the reconstruction of the Shepp-Logan phantom using the spatial overlap correlator method combined with the adaptive intereferer canceller algorithm according to the invention. The projection measurement data for the Shepp-Logan phantom included simulated motion of the left interior ellipse taking place during the data acquisition period of the CT scan. As is evident, the method for removing motion artifacts according to the invention is very effective. The image shows clearly the details of the Shepp-Logan phantom having sharp contours including the moving ellipse.

In contrast, the upper left image of FIG. 4, reconstructed using the prior art method, is blurred due to the motion of the left interior ellipse. All contours within the image are blurred and the different components cannot be distinguished. Such an image makes a reliable diagnosis very difficult if not impossible.

The upper middle image of FIG. 4 shows the result of the reconstruction process according to the invention expressed by equations (6) and (7). The reconstructed image shows only the moving left interior ellipse. This result is sometimes of diagnostic value in some special applications, for example, displaying heart functions. Furthermore, it provides valuable information for motion artefact removal.

The lower right panel of FIG. 4 shows the sensor time series of a typical sensor during the data acquisition process of a CT scanner for a full rotation of 360°. The top right curve is a sensor time series for the simulated phantom without motion. The center right curve in the panel shows the same sensor time series with motion of the left interior ellipse of the phantom. As is evident, the motion of the left interior ellipse introduces a high frequency disturbance into the sensor time series. The lower right curve shows the sensor time series provided by the spatial overlap correlator method containing only the high frequency disturbance associated with the organ motion. The lower left panel of FIG. 4 shows the result of the adaptive processing method according to the invention. The upper curve in the panel shows the sensor time series with motion of the left interior ellipse of the phantom. The curves below are sensor time series obtained with the adaptive processing method according to the invention. A substantial amount of the high frequency disturbances due to organ motion has been removed, thus providing evidence of the effectiveness of the method.

Figure 5A:
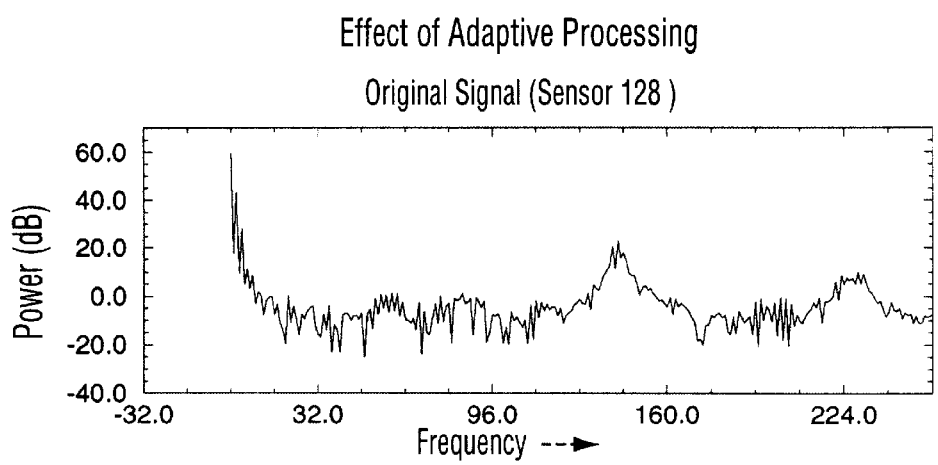
FIG. 5 illustrates a spectrum of various types of sensor time series.
Figure 5B:
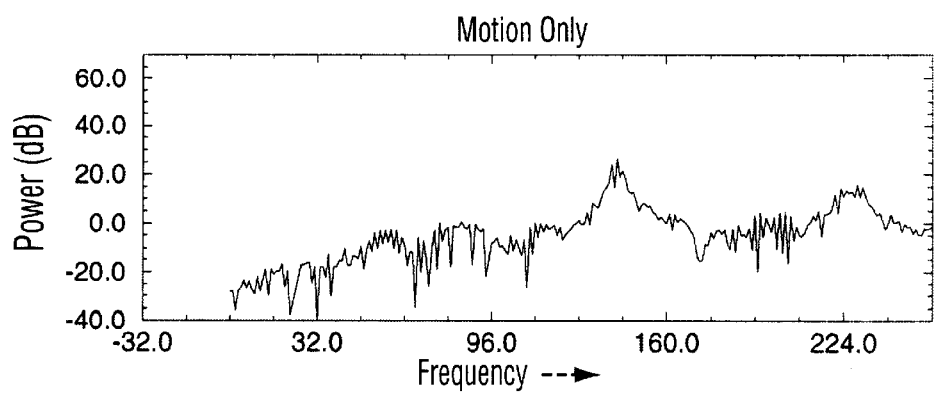
Figure 5C:
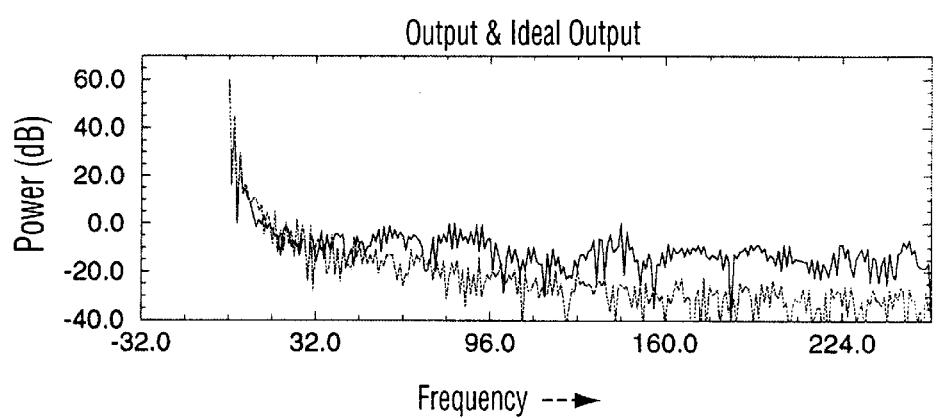
Figure 6A:
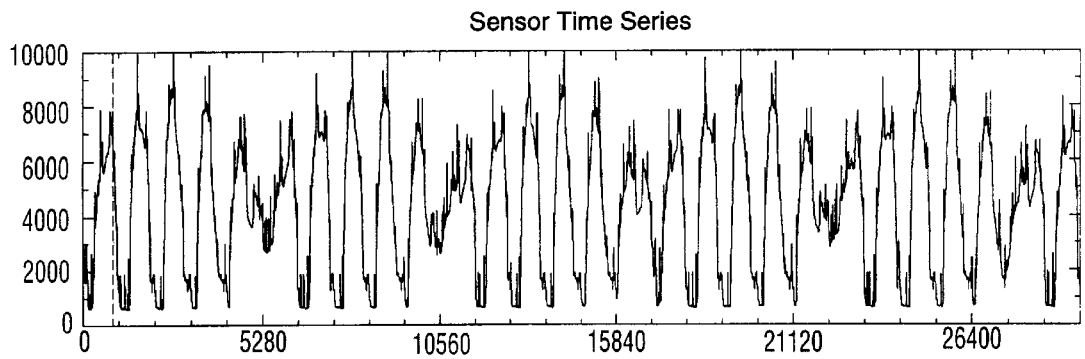
FIG. 6 illustrates processed sensor time series using a method according to the invention.
Figure 6B:
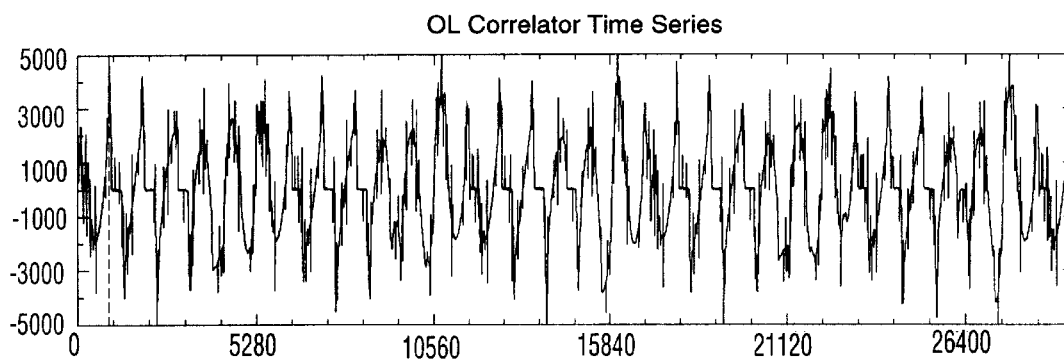
Figure 6C:
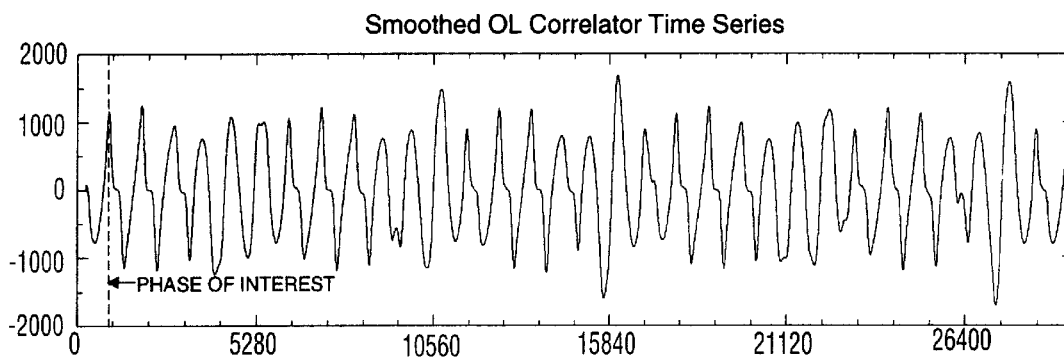
Figure 6D:
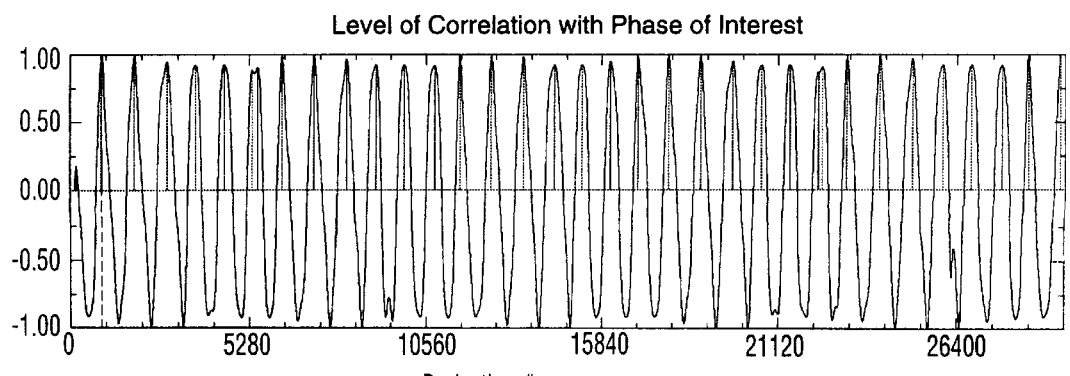

In order to obtain a quantitative measure of the effectiveness of the adaptive processing method according to the invention the spatial spectrum of the various types of sensor time series has been investigated. The upper curve in FIG. 5 shows the spatial spectrum of the sensor time series with motion of the left interior ellipse present. The center curve of FIG. 5 shows the spatial spectrum of the sensor time series after applying the spatial overlap correlator method. This curve corresponds to the lower curve of the lower right panel in FIG. 4. The lower diagram of FIG. 5 shows a comparison of the spatial spectrum of the sensor time series resulting from the adaptive processing method, indicated by the solid line, with the spatial spectrum of the sensor time series without motion of the left interior ellipse, indicated by the dashed line. It is apparent from this comparison that the adaptive processing method according to the invention suppresses the high frequency disturbances due to organ motion by approximately 40 dB. Comparison of these two curves also shows that this method does not remove small size spatial structures of the reconstructed image, that is, the peak and valley pattern of the spatial spectrum is not substantially altered by the adaptive processing method. Using a low pass filter suppresses the high frequency disturbances due to organ motion of the sensor time series; unfortunately, the low pass filter also suppresses high frequency components due to small size spatial structures in the tomography images as well.

In another method according to the invention information obtained using the spatial overlap correlator is directly used to identify various phases of organ motion present during a CT-scan data acquisition period. A CT-scan data acquisition period typically lasts between 0.5 and 1.25 seconds. Evaluation of sensor time series obtained from the spatial overlap correlator provides information about amplitude and direction of the motion of an organ at any given time instance. The upper diagram in FIG. 6 shows a sensor time series for a typical X-ray CT-scanner. Periodicity of the organ motion such as a heartbeat is not evident from this curve. The second diagram from top shows the sensor time series obtained using the spatial overlap correlator method. In order to remove high frequency disturbances introduced, for example, through background noise the sensor time series obtained using the spatial overlap correlator method has been smoothed as shown in the third diagram from top. Smoothing of measurement data is well known in the art and can be performed in time domain using smoothing filters, for example, Savitzky-Golay smoothing filters. As is evident, the curve shown in the third diagram displays a periodic waveform. Different phases of the periodic waveform correspond directly to the various phases of the organ motion. A phase of interest corresponding to a specific phase of the organ motion has then to be selected. In the diagrams of FIG. 6, the phase of interest is indicated by the dashed line. Autocorrelating the sensor time series shown in the third diagram with respect to the phase of interest reveals a repetition of the phase of interest in the remaining sensor time series. The autocorrelated sensor time series is shown in the fourth diagram from top. Time instances of the sensor time series with the organ being at a same point of its motion cycle—the phase of interest—are indicated by a level of correlation approaching one.

Figure 7:
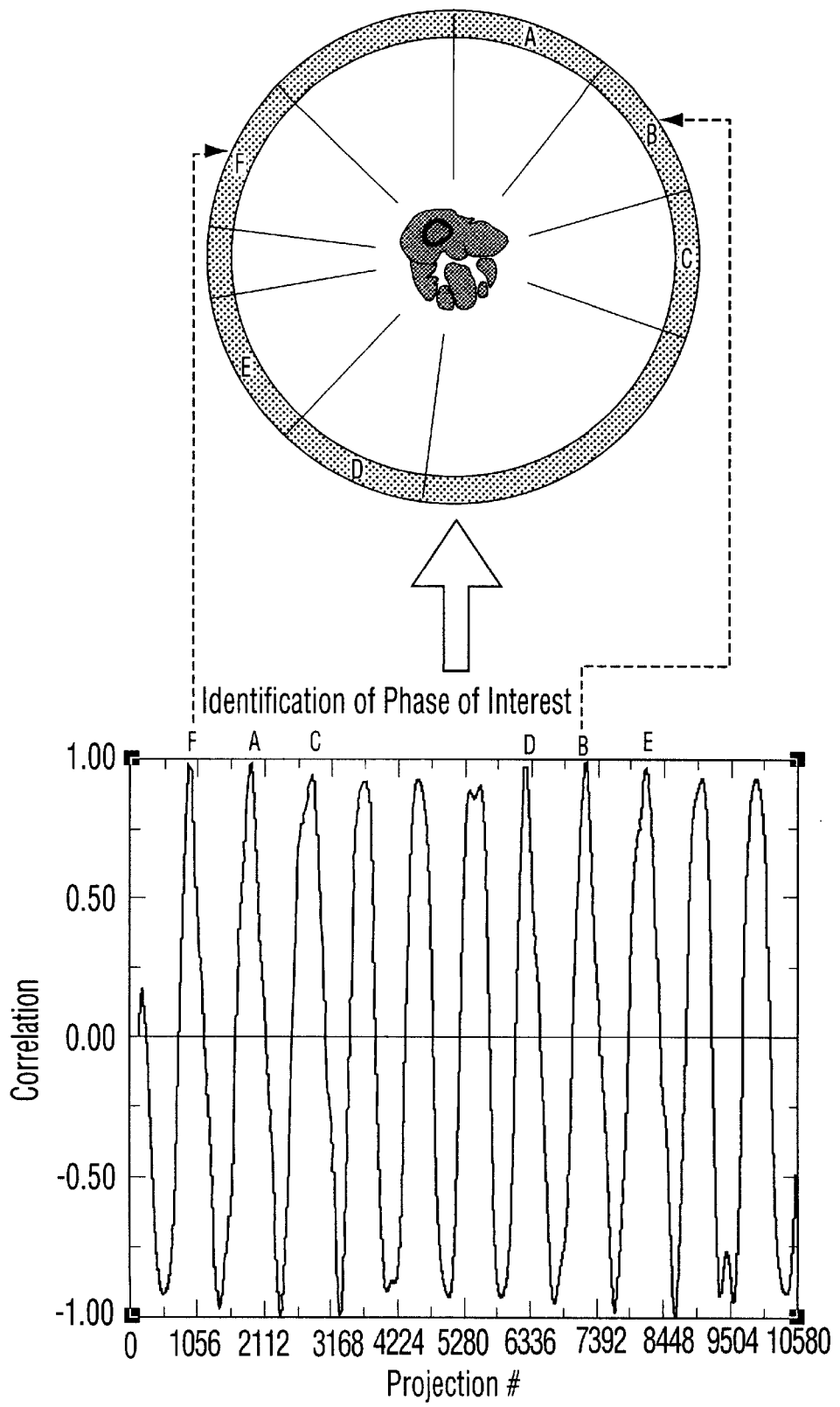
FIG. 7 illustrates creation of a sinogram according to the invention.
Figure 8A:
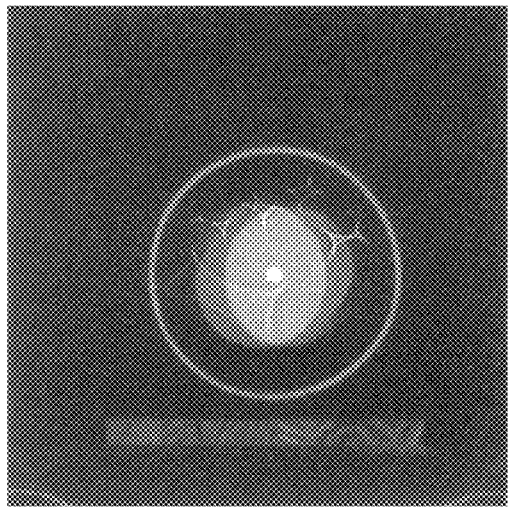
FIG. 8 shows results of motion artefact removal using the method according to the invention.
Figure 8B:
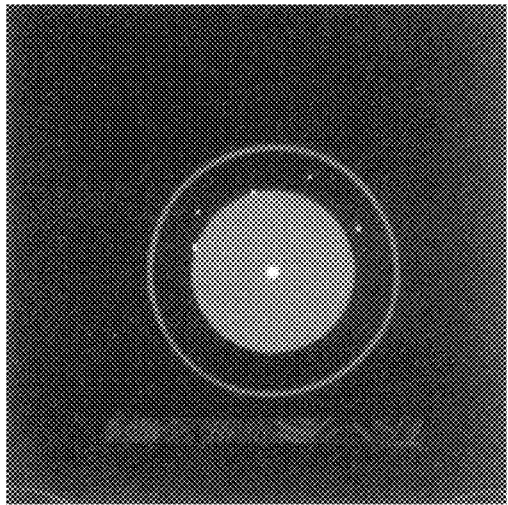
Figure 8C:
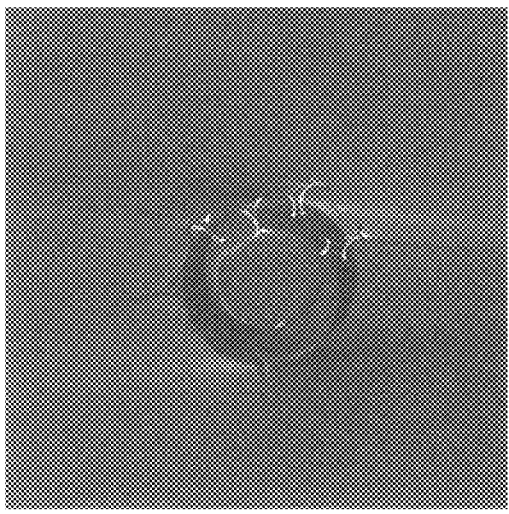
Figure 8D:
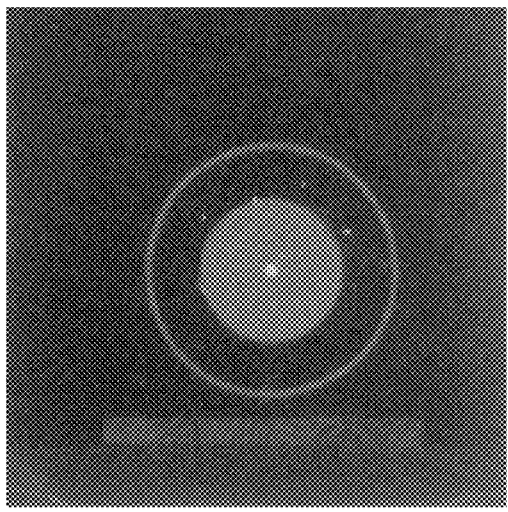

In order to create a sinogram for a single image of the organ at a desired point of its motion cycle segments of the sensor time series as shown in the third diagram from top have to be selected. For this purpose segments of the sensor time series with the organ motion being at the phase of interest have to be selected. The selection criterion for these segments is the level of correlation approaching one in the autocorrelation curve as shown in the fourth diagram from the top. FIG. 7 illustrates the autocorrelated sensor time series in relation to angular locations where projection image data of the sensor time series have been acquired relative to an object 1. The angular locations are determined by physical locations of a source and sensors (not shown in the figure) with respect to the object 1. As shown in FIG. 7, segments corresponding to projection image data taken in sectors B and F have a level of correlation approaching one, that is, the object 1 has been at a same phase of its motion cycle during acquisition of the projection image data in these sectors. Therefore, constructing a sinogram using only segments of the sensor time series having a correlation level approaching one is equivalent to freezing the motion of the object 1 to the selected phase of interest. Missing segments of the sensor time series are replaced using interpolation. Furthermore, number and size of missing sectors is reduced by increasing the number of sensors and/or acquiring sensor time series for more than one full rotation of the CT-scanner. Once a sinogram for a single phase of interest is completed an image of the object 1 is obtained using conventional image reconstruction methods. The resulting image is substantially free of motion artifacts equivalent to an image obtained from a stationary object. Of course, this method may be repeated for different phases of interest in order to obtain various images of the object 1 at different phases of its motion cycle. This method according to the invention is very helpful, for example, for the investigation of heart functions. Furthermore, this method allows to create a motion picture comprising a plurality of images following an entire motion cycle.

FIG. 8 shows a comparison of images obtained using the method according to the invention with images obtained using a prior art method. The top left image was obtained using an X-ray CT-scan system, according to the prior art, scanning a moving object. Comparison with the top right image taken with the same system of the object being stationary illustrates severe distortion of the image by motion artifacts. As is obvious, the motion artifacts render the top left image useless for any diagnosis. The bottom right image is an X-ray CT-scan of the moving object using the method according to the invention to correct for motion artifacts. This corrected image is substantially identical to the top right image of the stationary object. Using the method according to the invention to correct for motion artifacts improves significantly the functionality of CT systems. For example, current CT systems are not capable to detect calcifications—visible as white dots—in a heart's blood vessels as illustrated in the top left image. The calcifications appear as blurred lines and, therefore, it is impossible to make a diagnosis based on such an image. With an increasing number of patients having heart diseases the method according to the invention provides a new diagnostic tool that can save numerous lives. Of course, application of this method is not restricted to the investigation of heart function but allow use of CT scan in various application where the investigated object experiences some kind of motion.

Figure 9:
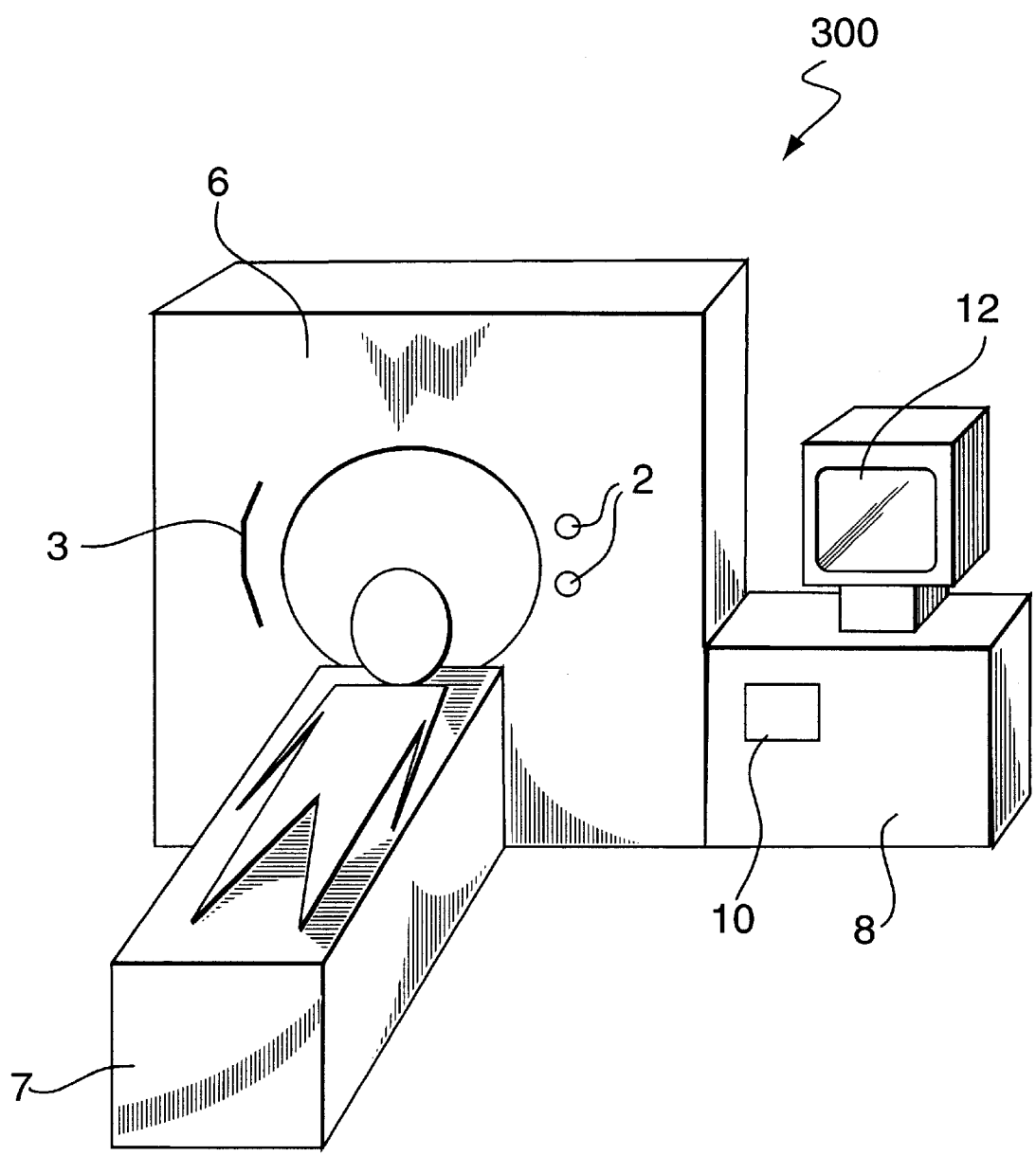
FIG. 9 illustrates a CT system according to the invention comprising two X-ray sources.

FIG. 9 shows a CT scanner 300 comprising a scanner unit 6, an object moving unit 7 and a processing unit 8. The scanner unit comprises two X-ray sources 2 and a receiving sensor array 3 rotatable 360° around an opening surrounding an object 1. Acquired data are being processed in the processing unit 8 comprising at least a processor 10 and reconstructed CT scan images are then displayed using display 12. An essential requirement of the spatial overlap correlator method is the implementation of the two X-ray sources 2 separated by an angular spacing equal to the sensor spacing of the receiving sensor array 3. However, state of the art X-ray sources are too big in size for implementation in a CT scanner with two sources.

Fortunately, the spatial overlap correlator method allows implementation in CT systems comprising flying focal point functionality such as Siemens CT systems or Elscint's CT Twin RTS system. The flying focal point functionality generates a second source 2 by deviating an electron beam by a magnetic field, which is defined as a new active emission of the source at an angle $\Delta\theta$ and time difference $\Delta t$ with respect to a previous source position. Typical values for $\Delta t$ are 1 ms providing spatial samples at ½ of the sensor spacing of the receiving sensor array 3. Therefore, the flying focal point functionality doubles a spatial sampling frequency of CT fan beam scanner without flying focal point. The spatial overlap correlator method according to the invention uses the flying focal point as a second source. The implementation of this method in CT systems with flying focal point functionality requires the second source being activated 1 ms after a previous X-ray emission and at a location of ⅛ sensor spacing to the location of the previous X-ray emission. The sensor time series associated with each one of the flying focal point X-ray source emissions have to be distinguished as defined by equation (6). Then, the sensor time series without any kind of pre-processing or image reconstruction are provided at the input of the proposed processing scheme.

Figure 10:
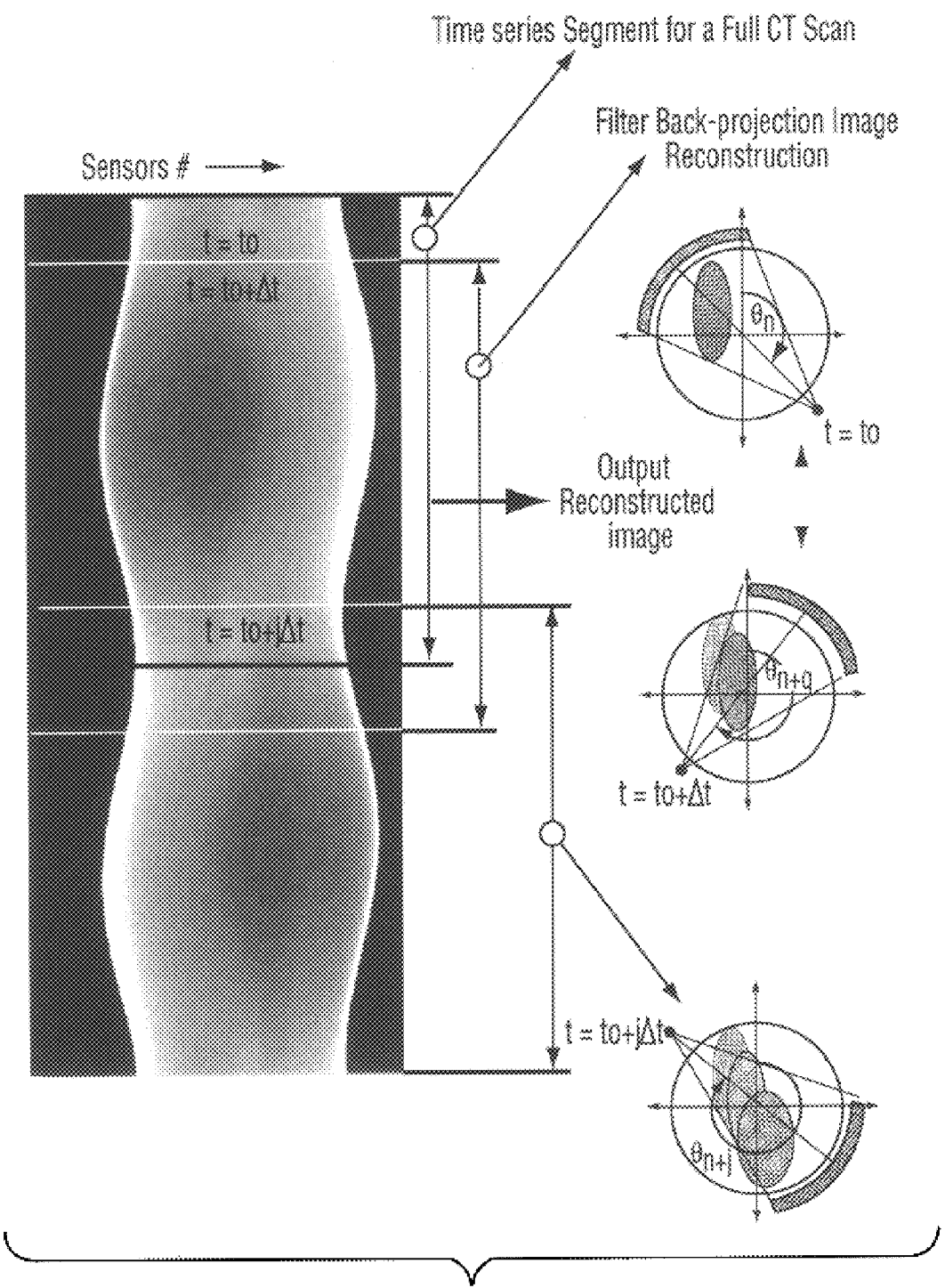
FIG. 10 is a schematic diagram of a method for generating motion pictures according to the invention; and, FIG. 11 is a schematic diagram of an implementation of a method for tracking organ motion, a method for removing motion artifacts and a method for generating a motion picture according to the invention.

Unfortunately, only the latest CT systems of Siemens and Elcint provide flying focal point functionality. Therefore, the implementation of the spatial overlap correlator method is presently restricted to implementation on only a small number of CT systems. Another method for tracking organ motion according to the invention does not require two sources as the spatial overlap correlator method. The left image of FIG. 10 illustrates measurements of all sensors of a receiving sensor array at different time instances. The measurements are displayed as a function of a plane defined by sensor number along the horizontal axis and time forming the vertical axis. Measurements of the receiving sensor array at a time instance comprise one line within the left image. The images at the right of FIG. 7 indicate different locations of a CT scanner comprising s source and a receiving sensor array with respect to an object for different time instances, as well as different locations of the moving object.

A time series segment—sinogram—associated with a full rotation of the CT scanner is defined as: $Z_n(j\Delta t)$, (n=1,2, ..., N & j=1,2, ..., M), wherein N is the number of sensors of the receiving array of the CT system and M is the number of projections during one full rotation of the CT scanner. The above time series are processed using a filter back-projection algorithm to provide a reconstructed image of the object's cross section $f(x,y)$ in the x, y plane associated with the CT measurements. The next time series segment, $\Delta t$ seconds later, is defined as: $Z_n(j\Delta t)$,(n=1,2, ... , N & j=2, ..., M +1). After processing using the filter back-projection algorithm it provides a reconstructed image of the object's cross section $f(x,y,\Delta t)$ comprising differences due to motion of the object and the CT scanner during the time interval $\Delta t$. For the second image to coincide with the first one rotation and alignment is required. Because the filter back-projection algorithm is a linear operator, the difference between the two images $\{f(x,y,\Delta t)-f(x,y)\}$ corresponds to the amplitude difference of the associated time series defined above. Therefore, a time series difference corresponding to the difference between the two images is defined by:

$$\Delta Z_n(j\Delta t) = \{Z_n[(M+j)\Delta t] - Z_n(j\Delta t)\}, (n=1,2,\ldots, N \& j=1,2,\ldots, M). \tag{8}$$

when appropriate image rotation is taken into account. Processing the time series difference $\Delta Z_n(j\Delta t)$ using the filter back-projection algorithm results in a reconstructed image tracking organ motion during the time interval $M\Delta t$ of the CT data acquisition. This information may then be used to remove motion artifacts using the adaptive processing method according to the invention. However, the effectiveness of the adaptive processing method combined with this method for tracking organ motion is reduced compared to the combination of the adaptive processing method with the spatial overlap correlator method. The reduction of effectiveness is caused by two fundamental differences between the two methods for tracking organ motion. Firstly, the second method tracks organ motion between two time instances separated by an initial time interval of $M\Delta t$. Secondly, the initial phase of the organ motion is out of phase with respect to the starting point of the CT data acquisition process. Therefore, the interference noise due to organ motion $\Delta Z_n(j\Delta t)$, $(n=1,2,\ldots, N \& j=1,2,\ldots, M)$ is out of phase with respect to the noisy input signal $Z_n(j\Delta t)$, $(n=1,2,\ldots, N \& j=2,\ldots, M+1)$.

In another embodiment of the second method for tracking organ motion according to the invention the processed time series differences $\Delta Z_n(j\Delta t)$ are used to produce a motion picture tracking organ motion observed during a long interval. For example, a CT scan over 30 seconds produces a set of 300 images separated by time intervals of 0.1 seconds. Continuous viewing of the 300 images indicates periodic or aperiodic organ motion. Such a motion picture is a very helpful diagnostic tool for observing, for example, heart functions. Generation of the motion picture is based on the data acquisition process illustrated in FIG. 10. In this case the time interval $\Delta t$ is 0.1 seconds. Alternatively, motion information obtained by using the spatial overlap correlator method is used to generate a motion picture.

Figure 11:
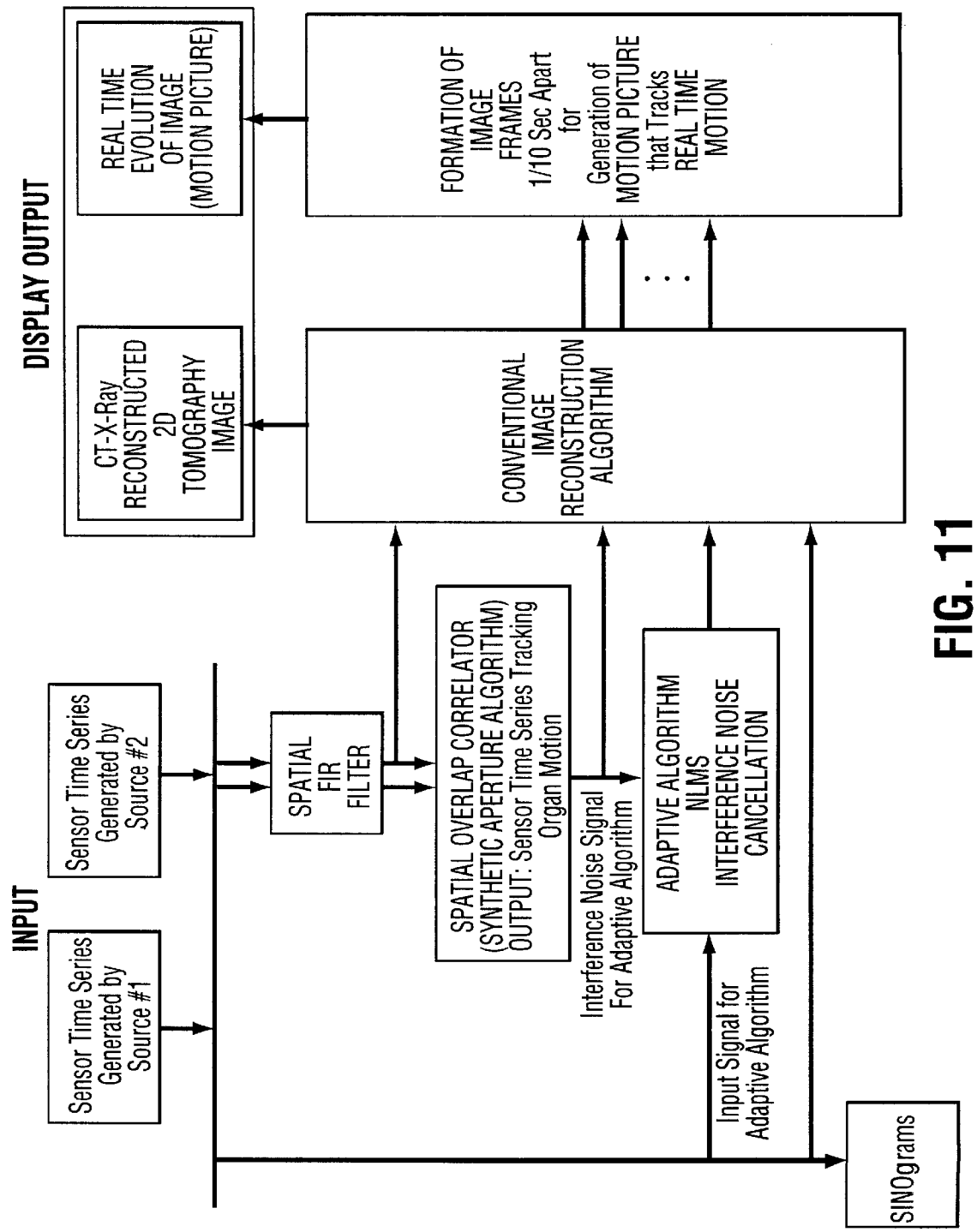

FIG. 11 illustrates a signal processing flow diagram for an implementation of the spatial overlap correlator method, the adaptive processing method and the method for generating a motion picture within current processing schemes for X-ray CT systems according to the invention. The signal processing methods according to the invention are indicated by shaded blocks, whereas current processing schemes for CT systems are indicated by unshaded blocks. For example, sensor time series generated by source #1 and/or source #2 are processed using a spatial finite impulse response (FIR) filter. The sensor time series may then be processed using a conventional image reconstruction algorithm or, preferably, processed using the spatial overlap correlator method for providing information due to organ motion. The resulting information is then used as interference noise signal for removing motion artifacts from the sensor time series using the adaptive processing method. The resulting sensor time series is then processed using the conventional image reconstruction algorithm to produce a reconstructed image for display. Alternatively, the resulting information is processed by the conventional image reconstruction algorithm to provide reconstructed images containing only information of moving components. Furthermore, CT scan data acquired within a long time period such as 30 seconds may be processed to obtain a motion picture.

Numerous other embodiments may be envisaged without departing from the spirit and scope of the invention.

What is claimed is:

1. A method of tracking motion present during computer tomography scan data acquisition of an object, the method comprising the steps of:

capturing a plurality of image pairs, each image within an image pair captured from substantially a same perspective view of the object;

comparing each image within an image pair of the image pairs to another image of the same image pair to extract differences; and, determining motion using the extracted differences.

2. A method of tracking motion present during computer tomography scan data acquisition of an object as defined in claim 1, wherein the step of capturing a plurality of image pairs comprises the steps of:

a) disposing a source at a first position;

b) emitting energy and capturing an image;

c) altering a parameter of the system such that the emitted energy appears to originate from a second other position;

d) emitting energy and capturing an image;

e) moving the source to the second other position; and, iterating steps (b) through (e) wherein the second other position is a different position from the second other position of a previous iteration.

3. A method of tracking motion present during computer tomography scan data acquisition of an object as defined in claim 1, wherein the motion is determined as an amplitude difference between data indicative of the compared images.

4. A method of removing motion artifacts in image data of computer tomography scans of an object comprising the steps of:

providing to a processor image data of the object, the image data containing motion artifacts due to motion of the object;

providing to the processor data indicative of the motion of the object; and, using the processor, removing the motion artifacts from the image data using adaptive interference canceling.

5. A method of removing motion artifacts in reconstructed images of computer tomography scans of an object as defined in claim 4, wherein the image data and the data indicative of the motion of the object are provided to the processor as sensor time series.

6. A method of tracking motion of components of an object present during computer tomography scan data acquisition of the object, the method comprising the steps of:

rotating intermittently a scanner comprising a source and a receiving sensor array in angular step increments around the object such that the object is irradiated from successive locations at successive time instances;

acquiring projection measurement data at each time instance using the receiving sensor array; and, providing to a processor the projection measurement data for processing;

processing the projection measurement data, the processing comprising the steps of:

determining successive sensor time series segments, each segment being associated with a full rotation of the scanner and a time difference $\Delta t$ to a previous segment;

determining an amplitude difference between successive time series segments; and, determining data indicative of organ movement by processing the amplitude differences using a filter back-projection algorithm.

7. A method of tracking motion of components of an object present during computer tomography scan data acquisition of the object as defined in claim 6, wherein the scanner is rotated a plurality of full rotations.

8. A method of tracking motion of components of an object present during computer tomography scan data acquisition of the object as defined in claim 7, comprising the step of:

using the processor for generating an animated image tracking organ movement.

9. A computer tomography system for acquiring projection image data of an object and for tracking motion of the object during the data acquisition comprising:

a source disposed at a first position for emitting energy in order to irradiate the object;

a receiving sensor array for capturing image pairs, wherein each image within an image pair is captured from substantially a same perspective view of the object;

means for irradiating the object such that the emitted energy appears to originate from a second other position;

a mechanism for moving the source to the second other position; and, a processor for comparing the image pairs to extract differences and for determining motion using the extracted differences.

10. A computer tomography system for acquiring projection image data of an object and for tracking motion of the object during the data acquisition as defined in claim 9, wherein the means for irradiating the object such that the emitted energy appears to originate from a second other position comprises a second other source.

11. A computer tomography system for acquiring projection image data of an object and for tracking motion of the object during the data acquisition as defined in claim 9, wherein the means for irradiating the object such that the emitted energy appears to originate from a second other position comprises a flying focal point.

12. A method of tracking phases of a motion cycle of an object present during computer tomography scan data acquisition of the object, the method comprising the steps of:

a) providing to a processor sensor time series, the sensor time series being indicative of projection image data of the object;

b) using the processor, processing the sensor time series to determine spatial overlap correlator time series indicative of amplitude and direction of the object motion;

c) determining a phase of interest of the motion cycle; and, d) autocorrelating the spatial overlap correlator time series with respect to the phase of interest.

13. A method of tracking phases of a motion cycle of an object present during computer tomography scan data acquisition of the object as defined in claim 12, comprising the step of smoothing the spatial overlap correlator time series.

14. A method of tracking phases of a motion cycle of an object present during computer tomography scan data acquisition of the object as defined in claim 12, wherein the steps c) and d) are repeated for different phases of interest.

15. A method of tracking phases of a motion cycle of an object present during computer tomography scan data acquisition of the object as defined in claim 12, comprising the steps of:

e) selecting segments of the spatial overlap correlator time series, the segments being indicative of projection image data of the object, the object being at the phase of interest of the motion cycle;

f) creating a sinogram of the object at the phase of interest from the selected segments; and, g) reconstructing an image of the object at the phase of interest using the sinogram.

16. A method of tracking phases of a motion cycle of an object present during computer tomography scan data acquisition of the object as defined in claim 15, wherein the segments are selected based on a level of correlation of the autocorrelated sensor time series.

17. A method of tracking phases of a motion cycle of an object present during computer tomography scan data acquisition of the object as defined in claim 15, wherein missing segments of the sinogram are obtained by interpolation.

18. A method of tracking phases of a motion cycle of an object present during computer tomography scan data acquisition of the object as defined in claim 15, wherein the steps are e), f) and g) are repeated for different phases of interest to create a motion picture.

* * * * *